United States Patent [19]

Latarnik et al.

[11] Patent Number: 5,614,882
[45] Date of Patent: Mar. 25, 1997

[54] PROCESS AND CIRCUIT FOR MONITORING TIRE PRESSURE

[75] Inventors: Michael Latarnik, Friedrichsdorf; Norbert Ehmer, Eschborn, both of Germany

[73] Assignee: ITT Automotive Europe GmbH, Frankfurt, Germany

[21] Appl. No.: 464,672

[22] PCT Filed: Oct. 13, 1994

[86] PCT No.: PCT/EP94/03373

§ 371 Date: Sep. 14, 1995

§ 102(e) Date: Sep. 14, 1995

[87] PCT Pub. No.: WO95/12498

PCT Pub. Date: May 11, 1995

[30] Foreign Application Priority Data

Nov. 3, 1993 [DE] Germany ............... 43 37 443.3

[51] Int. Cl.$^6$ .................................................. B60C 23/02
[52] U.S. Cl. .................. 340/444; 340/442; 73/146.5; 116/34 R
[58] Field of Search .................. 340/442, 444; 73/146.2, 146.5; 364/426.02; 116/34 R

[56] References Cited

U.S. PATENT DOCUMENTS

| | | | |
|---|---|---|---|
| 3,581,277 | 5/1971 | Beatty, Jr. et al. | 340/444 |
| 4,876,528 | 10/1989 | Walker et al. | 340/444 |
| 5,192,929 | 3/1993 | Walker et al. | 340/444 |
| 5,210,692 | 5/1993 | Fennel et al. | 364/426.02 |
| 5,218,862 | 6/1993 | Hurrell, II et al. | 340/444 |
| 5,513,523 | 5/1996 | Sekiya et al. | 340/444 |
| 5,524,482 | 6/1996 | Kushimoto et al. | 340/444 |
| 5,541,573 | 7/1996 | Jones | 340/444 |

FOREIGN PATENT DOCUMENTS

| | | |
|---|---|---|
| 0466535 | 1/1992 | European Pat. Off. . |
| 0552827 | 7/1993 | European Pat. Off. . |
| 2568519 | 2/1986 | France . |
| 3236520 | 4/1984 | Germany . |
| 3915879 | 11/1990 | Germany . |
| 4228894 | 3/1994 | Germany . |
| 63-305011 | 12/1988 | Japan . |
| 1532823 | 12/1989 | U.S.S.R. . |

OTHER PUBLICATIONS

William, Roger: DWS—ein neues Druckverlust–Warnsystem fur Automobilreifen, ATZ Automobiltechnische Zeitschrift 94,6,1992, S.336–340.

Primary Examiner—Jeffery Hofsass
Assistant Examiner—Daniel J. Wu
Attorney, Agent, or Firm—Thomas N. Twomey; J. Gordon Lewis

[57] ABSTRACT

A process for monitoring tire pressure by comparing and evaluating the rotating speeds of the individual wheels of the vehicle which is based on the formation of speed correction factors. The values of the individual correction factors, correlations between the correction factors for typical travel situations, and tolerances for the correction factors, which depend on the actual travel situation, are determined during a learning phase (i.e. phase 1). The deviations of the correction factors from the learned values are determined and evaluated during a subsequent identification phase (i.e. phase 2), taking into account the travel situation-dependent tolerances and the progression of the learning process. Loss of tire pressure is signaled when the current speed correction factor determined for a wheel during the identification phase becomes smaller, taking into account the current deviation, than the speed correction factor already learned, taking into account the tolerance already determined for the current travel situation.

14 Claims, 3 Drawing Sheets

PROCESS AND CIRCUIT FOR MONITORING TIRE PRESSURE

This application is the U.S. national-phase application of PCT International Application No. PCT/EP94/03373.

BACKGROUND OF THE INVENTION

The present invention pertains to a process for monitoring the tire pressure of the wheels of a vehicle by measuring, comparing and evaluating the rotating speeds of the individual wheels of the vehicle. The present invention also includes a circuit for carrying out the process.

Processes for recognizing the loss of tire pressure, which are based on the measurement and the comparison of the rotating speeds of the individual wheels of the vehicle, already are known from U.S. Pat. Nos. 4,876,528 and 5,192,929. In principle, the rotating speeds of the diagonally opposite wheels are added according to both of these patents, and the difference between the two sums is determined. If this difference is between 0.05% and 0.60% of the mean value of the two sums, the rotating speed of every individual wheel may deviate by at most 0.1% from the mean speed of all four wheels as long as a sufficient tire pressure is present. Loss of pressure is signaled in the case of greater deviations.

The accuracy of these prior art techniques leaves something to be desired. When a spare tire or "emergency tire" with a different diameter is mounted, the method can fail completely.

Other processes, based, in principle, on the same algorithm, are known from U.S. Pat. No. 3,581,277, JP 63-305011(A), and FR-25 685 19-A.

A process for evaluating the speed signals, which reflect the rotation behavior of the individual wheels of a vehicle, is known from DE 39 15 879-A1, in which a speed correction factor is determined for each wheel. The multiplication of the instantaneous wheel speed by the speed correction factor yields a common basic speed, which is derived from, e.g., the speed of the instantaneous slowest wheel. The wheel speed multiplied by the corresponding correction factor is then used as the basis for further signal processing, instead of the actual wheel speed. The process is used to determine the rotation behavior of a wheel within the framework of an antilock system.

SUMMARY OF THE INVENTION

An objective of the-present invention is to provide a process for monitoring the tire pressure, which is characterized by higher accuracy and reliability compared with the prior art processes, and which can be used even when tires, which have different rolling circumferences as a consequence of manufacturing tolerances, uneven wear or the like, or because they are used only as emergency wheels, are mounted.

It has been found that this objective can be accomplished by a process in which velocity correction factors are formed for the individual wheels of the vehicle, and these factors, multiplied by the wheel speed, yield a basic speed, and the values of the individual correction factors are determined in a learning phase. Correlations are determined between the correction factors for typical driving situations. Band widths or "tolerances" that depend on the actual travel situation are determined for the correction factors. The deviations of the correction factors from the learned values are determined and evaluated in an identification phase, taking into account the tolerances that depend on the travel situation and the progression of the learning process. Loss of tire pressure is signaled when, taking the current deviation into account, the current correction factor for one wheel becomes smaller than the speed correction factor already learned during the learning phase for the corresponding wheel for the current travel situation, taking into account the tolerance already determined for the current travel situation during the learning phase.

The process according to the present invention for monitoring the tire pressure is consequently based on the formation and the evaluation of speed correction factors, which more or less compensate for the differences in the diameters of the individual wheels, and on the division of the process into a learning phase and an identification phase. The values of the individual correction factors and correlations between these factors in typical travel situations, e.g., during straight travel or travel in curves, are first learned. The learning phase is followed by the identification phase, during which the deviations from the learned correction factors are evaluated, taking into account the travel situation. As soon as the learning process has progressed to the extent that the value of the correction factor has been determined with high accuracy, and a travel situation, e.g., normal straight travel, in which only slight deviations of the correction factors are possible in the case of intact tires, prevails, loss of tire pressure or the resulting reduction in diameter can be recognized with high accuracy.

According to an advantageous embodiment of the present invention, loss of tire pressure is signaled when the following condition is satisfied for a wheel:

$$K_x(t,FS)+G2_x(t,FS)<K_{Sp,x}(FS)-G1_{Sp,x}(FS),$$

in which x is wheel 1, wheel 2, wheel 3, wheel 4,

FS is the travel situation, $K_x(t,FS)$ is the current correction factor determined for wheel x during the identification phase (phase 2), $K_{Sp,x}(FS)$ is the speed correction factor for wheel x expected for the current travel situation FS, which was already determined in phase 1, $G1_{Sp,x}(FS)$ is the tolerance already determined in phase 1 for the current travel situation FS, and $G2_s(t,FS)$ is the current deviation for wheel x in phase 2.

The typical travel situations, in which correlations between the correction factors are determined and evaluated, include, e.g., one or more of the following situations: travel in curves, straight travel, high acceleration or deceleration of the vehicle, rough road section, high drive slip or wheel slip while braking, high or low coefficient of friction, difference in the coefficients of friction on the right and left sides, etc.

Relevant correlations are formed, e.g., by a comparison of the correction factors in pairs, axle by axle, diagonally or side by side, i.e., by all or some of these measures.

The correction factor tolerances are preferably evaluated according to accuracy values, which are determined during the learning phase. The sensitivity thresholds, which lead to the signaling of a pressure loss when the deviations exceed these thresholds, are varied, according to one exemplary embodiment of the present invention, as a function of the travel situation or as a function of the travel situation and the progression of learning.

Provisions are also made according to the present invention to start the learning phase by predetermined events, such as the mounting of a wheel, reset signal, and/or by regularly recurring events, such as the start of the vehicle or engine, expiration of a predetermined period of time, etc.

According to one exemplary embodiment, the learning phase is concluded when the correction factors reach a predetermined accuracy threshold, either taking into account the actual travel situation or under the assumption of ideal conditions.

The identification phase is started only after the conclusion of the learning phase, or as soon as a minimum accuracy threshold has been reached during the learning phase.

According to another exemplary embodiment of the present invention, it is possible to preset a plurality of accuracy thresholds, and the sensitivity threshold is varied as a function of the accuracy threshold reached during the learning phase.

A circuit for carrying out the process according to the present invention is provided with a low-pass filter circuit, which is used for forming the speed correction factors on the basis of the wheel speed signals, and whose attenuation characteristic is variable as a function of the travel situation, which is reflected by the output signal of a travel situation recognition signal. In addition, there are circuits for determining the tolerances that depend on the travel situation and circuits for determining the deviations from the learned speed correction values.

Further features, advantages and possible applications of the present invention will appear from the following explanations of details of the present invention taken in connection with the drawings.

DETAILED DESCRIPTION OF THE INVENTION

Figure 1:
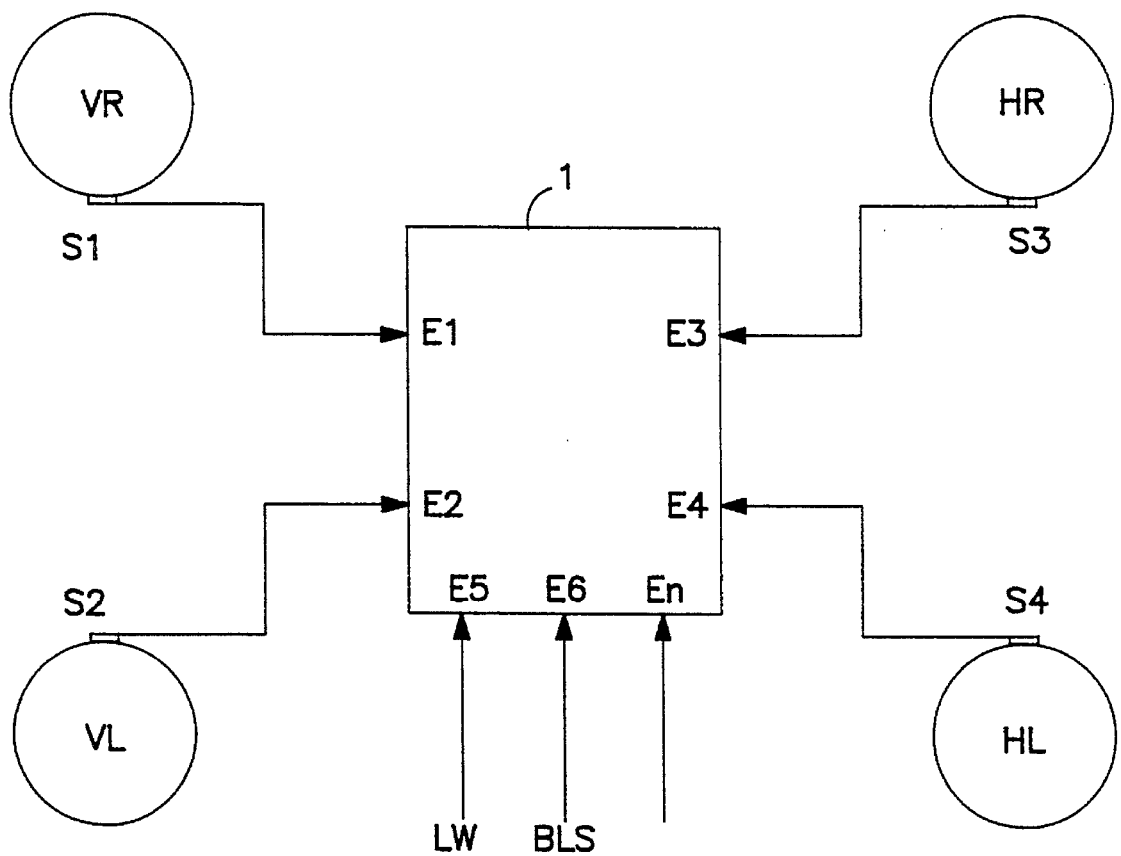
FIG. 1 is a schematic diagram of the most important components of a circuit for carrying out the process according to the present invention.

In FIG. 1, the four wheels of a motor vehicle are designated by the symbols VR, VL, HR, HL. Each wheel is equipped with a wheel sensor S1, S2, S3, and S4 which sends a signal, whose frequency and/or amplitude reflects the speed of the associated wheel.

An electronic circuit 1 is used to process and evaluate the sensor signals and to generate a warning signal. Besides the inputs E1 through E4 for the signals of the sensors S1 through S4, this electronic control circuit has additional inputs E5, E6, En for receiving additional information needed for the tire pressure monitoring process or for starting the process. In the exemplary embodiment shown, a steering angle sensor LW, which sends a signal that is important for distinguishing travel in a curve from straight travel, is connected to an input E5. An input E6 for a brake light switch BLS is indicated as well. Additional inputs En are used to connect additional sensors, external memories for values already learned, etc., depending on the embodiment and the mode of application of the present invention.

Wheel sensors of the above-described type and electronic circuits for evaluating and processing the signals, which can also be used, at least partially, for monitoring the tire pressure, are already present in vehicles equipped with antilock or drive slip control systems. The required additional expense for tire pressure monitoring according to the present invention becomes minimal if such control systems are present.

Figure 2:
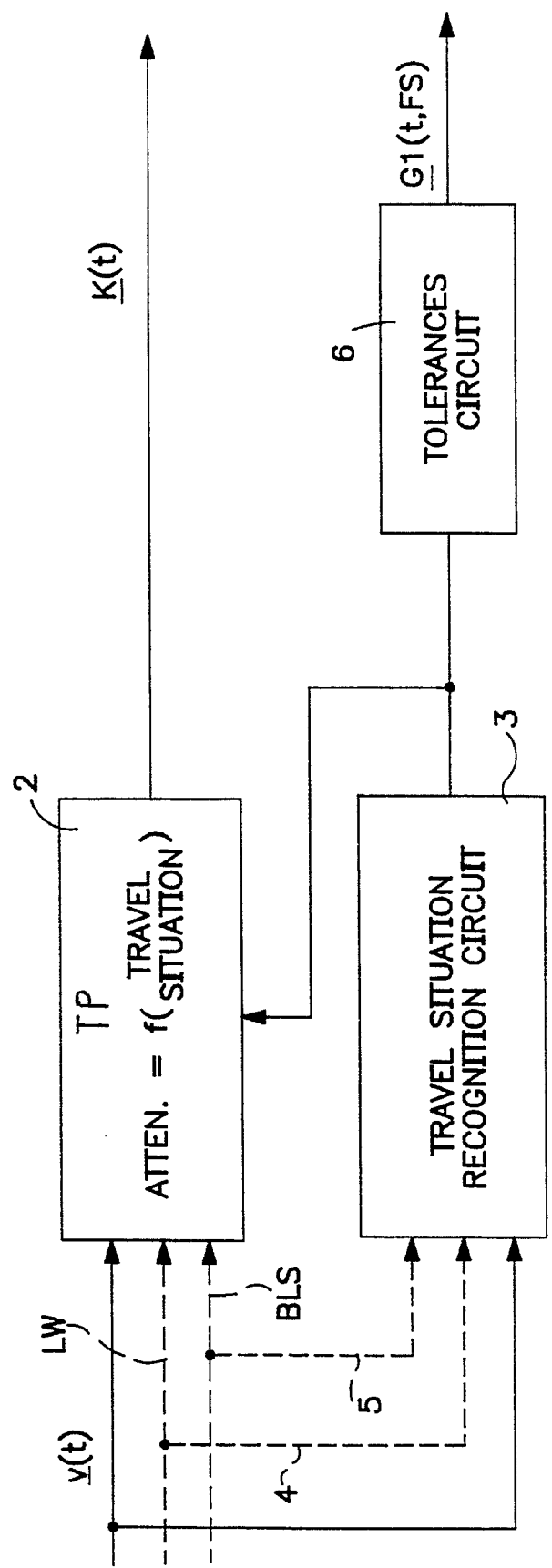
FIG. 2 is a simplified schematic representation of the most important steps of a first phase (learning phase) of the process according to the present invention.

FIG. 2 is used to illustrate phase 1, i.e., the learning phase, of the process according to the present invention. The wheel speed signals v(t), obtained by means of the wheel sensors S1 through S4 (see FIG. 1) and processed, are sent for this purpose to a low-pass filter circuit 2. Speed correction factors K(t), which are an indicator of the deviation of the wheel speeds of the individual wheels from a basic speed, are determined by means of such filter circuits in a known manner, as is described in DE 39 15 879 A1 cited above. By definition, the speed correction factors are values which, multiplied by the corresponding wheel speed, yield the basic speed. A basic speed common to all wheels can be formed. The correction factors are now determined in a learning process, in which the change compared with the preceding cycle is determined during each calculation cycle, and evaluated for correcting the current speed correction factor.

As is shown in FIG. 2, the speed correction factors K(t,FS) are obtained by means of low-pass filter circuit 2, whose attenuation characteristic ("ATTEN.") is a function of the driving situation. The vectorial notation $$\underline{K}(t, FS) = \begin{matrix} K_1(t, FS) \\ K_2(t, FS) \\ K_3(t, FS) \\ K_4(t, FS) \end{matrix}$$

expresses the fact that an individual speed correction factor applies to each wheel.

Whether travel in a curve, straight travel, low coefficient of friction or high coefficient of friction, wheel slip or drive slip or another typical travel situation is present is recognized in a travel situation recognition circuit 3 for recognizing the travel situation from the speed signals v(t) of the individual wheels, using additional information fed in via lines 4 and 5 shown in broken line in this example. The travel situation recognition signal is sent to the low-pass filter circuit 2, on the one hand, and, on the other hand, to a tolerances circuit 6, which is used to determine or estimate travel situation-dependent band widths or "tolerances" G1(t, FS) for the speed correction factors.

The correction factors K(t,FS) of the individual wheels are formed in the low-pass filter circuit 2 in a learning process. The learning process depends on the travel situation FS. For example, the correction factors are learned more rapidly during straight travel with "normal" acceleration, i.e., outside the phases of high wheel slip or starting slip, than during travel in a curve, on a rough road section, etc. Very generally, the following formula applies:

$$K_1(n+1)=K_1(n)+L(V_{Basis,1}-K_1(n)\times V_1),$$

in which "$K_1$" is the correction factor for wheel "1", "n" and "n+1" indicate two consecutive scanning processes, L is the travel situation-dependent parameter, which equals, e.g., $10^{-5}$ in the case of straight travel and becomes much smaller, e.g., $10^{-7}$ or $10^{-8}$ in other, unfavorable situations (curves, rough road section, etc.).

Correlations are determined according to the present invention between the speed signals v(t) or correction factors K(t) of the individual wheels for the typical travel situations. To do so, the wheels are compared, e.g., in pairs, diagonally, side by side, axle by axle, etc. This is performed in the circuit 6. The determined or estimated tolerances G1(t,FS) are therefore a function of the actual travel situation and of the progression (t) of the learning phase, taking into account the predetermined correlations between the correction factors K(t) or between the wheel speeds v(t).

The learning phase is concluded when the correction factors K(t,FS) reach a certain accuracy threshold G10, taking the actual travel situation into account. It is also possible to define a plurality of accuracy thresholds G10, G10', G10", ..., and to start the subsequent identification phase as soon as a minimum accuracy threshold G10 has been reached during the learning phase. The sensitivity threshold is then raised when the next higher accuracy threshold G10' is reached, so that even smaller differences in air pressure or smaller correction factor differences lead to the display of a loss of tire pressure.

Figure 3:
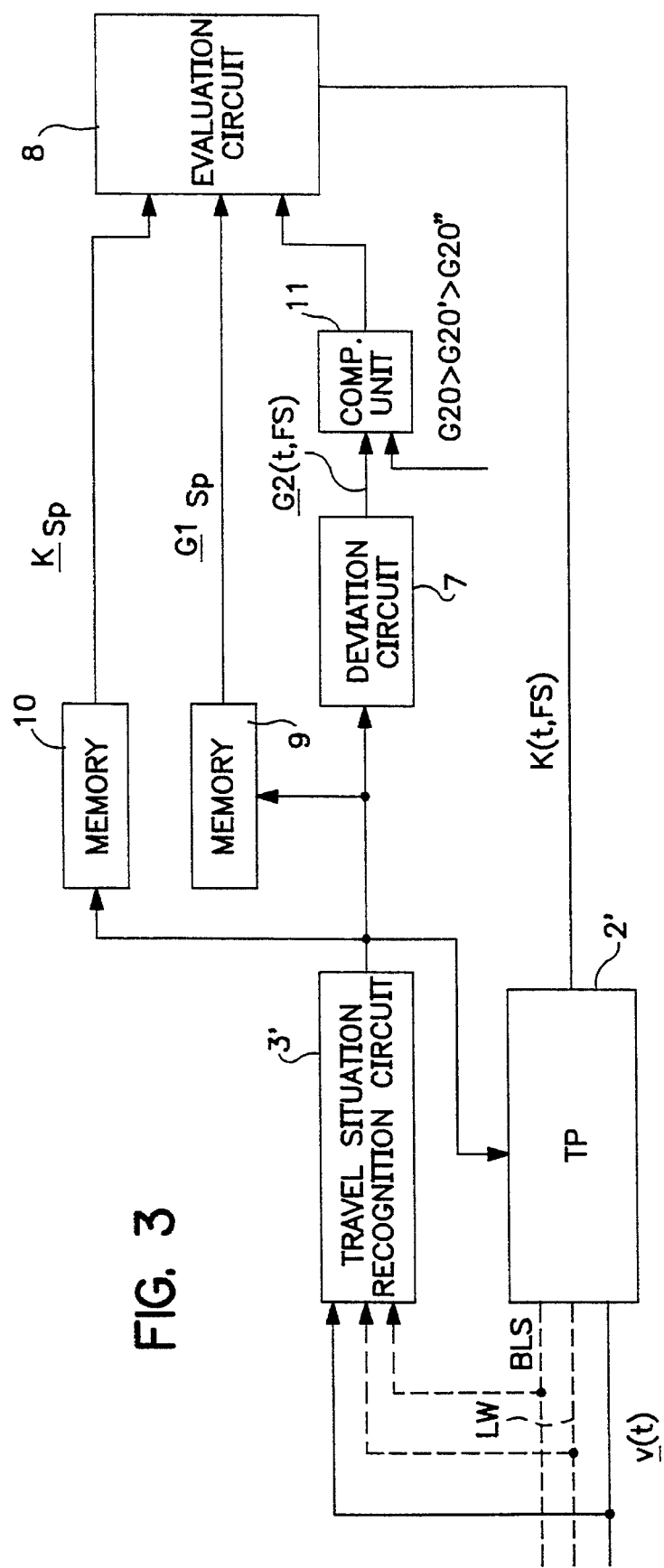
FIG. 3 is a simplified schematic representation of the most important steps of a second phase (identification phase) of the process according to the present invention.

The learning phase is followed by the identification phase (phase 2) shown in FIG. 3.

The travel situation recognition by means of a travel situation recognition circuit 3' and the formation of the speed correction factors K(t,FS) by means of a low-pass filter circuit 2' on the basis of the wheel speed signals v(t) and possibly of additional information are the same as or similar to the corresponding steps in the learning phase according to FIG. 2. The deviations G2(t,FS) of the current correction factors K(t,FS) from the values already learned, taking into account the travel situation, are determined or estimated in a deviation circuit 7. The current deviations G2(t,FS) are compared in a comparison unit 11 with sensitivity thresholds G20, G20', G20", and they are sent to an evaluation circuit 8. In the evaluation circuit 8, the current speed correction values K(t,FS) of the individual wheels are compared, taking into account the current deviation G2(t,FS), with speed correction factors $K_{Sp}$ already learned, i.e., determined during the learning phase for the instantaneous travel situation, taking into account the instantaneous tolerance $G1_{Sp}$, which has also been learned already. The learned values $K_{Sp}$ and $G_{Sp}$ are taken from memories 9 and 10. The evaluation circuit 8 recognizes a loss of tire pressure from the signals sent to it when the condition $$K_x(t,FS)+G2_x(t,FS)<K_{Sp,x}(FS)-G1_{Sp,x}(FS)$$

is satisfied. The meanings of the individual terms are as follows:

x is wheel 1, wheel 2, wheel 3, wheel 4,

FS is the travel situation, $K_x(t,FS)$ is the current speed correction factor determined for wheel x during the identification phase (phase 2), $K_{Sp,x}(FS)$ is the speed correction factor for wheel x, which is expected in the instantaneous travel situation FS and was already determined in phase 1, $G1_{Sp,x}(FS)$ is the tolerance already determined for the current travel situation FS during phase 1, and $G2_x(t,FS)$ is the current deviation for wheel x during phase 2.

The memories 9,10 are preferably reset each time a wheel is changed. This may be performed in the shop, or a hand switch can be provided for resetting. The sensitivity of the tire pressure monitoring now increases as a function of the learning process, taking the corresponding travel situation into account.

The deviations G2(t,FS) are compared with predetermined sensitivity thresholds G20, G20', G20", etc. The threshold G20 is in effect when a minimum accuracy threshold (G10) of the speed correction factors K(t,FS) is reached. If a higher accuracy had already been "learned," G20' is in effect, while G20" is in effect at an even higher accuracy, etc.

We claim:

1. Process for monitoring tire pressure by measuring, comparing and evaluating the rotating speeds of the individual wheels of the vehicle, wherein speed correction factors are formed for the individual wheels of the vehicle in a learning phase according to a learning process, characterized in that the speed correction factors are values which, multiplied by the respective wheel speed, yield a basic speed, correlations between the correction factors for typical travel situations are determined, and tolerances as a function of the respective travel situation are determined for the correction factors;

the deviations of the correction factors from the learned values are determined and evaluated in an identification phase, taking into account the travel situation-dependent tolerances and the progression of the learning process, and loss of tire pressure is signaled when the current correction factor for a wheel becomes smaller, taking into account the current deviation, than the speed correction factor already determined for the wheel in question for the current travel situation during the learning phase, taking into account the tolerance already determined for the current travel situation during the learning phase.

2. Process in accordance with claim 1, characterized in that loss of tire pressure is signaled when the following condition is satisfied for a wheel:

$$K_x(t,FS)+G2_x(t,FS)<K_{Sp,x}(FS)-G1_{Sp,x}(FS),$$

in which x is wheel 1, wheel 2, wheel 3, wheel 4,

KS is the travel situation, $K_x(t,FS)$ is the current correction factor determined for wheel x during the identification phase, $K_{Sp,x}(FS)$ is the correction factor already determined during the learning phase for wheel x for the current travel situation, $G1_{Sp,x}(FS)$ is the tolerance already determined in the learning phase for the current travel situation, and $G2_x(t,FS)$ is the current deviation for wheel x during the identification phase.

3. Process in accordance with claim 2, characterized in that one or more of the following situations are recognized as typical travel situations in which correlations between the correction factors are determined and evaluated: Travel in curve, straight travel, high acceleration or deceleration of the vehicle, rough road section, high drive slip or high wheel slip, high or low coefficient of friction, different coefficients of friction on the right and left sides, etc.

4. Process in accordance with claim 3, characterized in that the correlations are formed by comparison of the wheel speeds or of the correction factors in at least one of pairs, axle by axle, diagonally and side by side.

5. Process in accordance with claim 4, characterized in that the evaluation of the tolerances of the correction factors is performed according to accuracy thresholds reached during the learning phase as a function of the travel situation and of the progression of the learning process.

6. Process in accordance with claim 5, characterized in that the sensitivity thresholds are varied as a function of the travel situation.

7. Process in accordance with claim 5, characterized in that the sensitivity thresholds are varied as a function of the travel situation and the progression of the learning phase.

8. Process in accordance with claim 6, characterized in that the learning phase is started by predetermined events.

9. Process in accordance with claim 8, characterized in that the learning phase is concluded when the correction factors have reached, taking into account the actual travel situation or under ideal conditions, a predetermined accuracy threshold.

10. Process in accordance with claim 9, characterized in that the identification phase is started only after the conclusion of the learning phase.

11. Process in accordance with claim 10, characterized in that the identification phase is started as soon as a minimum accuracy threshold is reached during the learning phase.

12. Process in accordance with claim 11, characterized in that a plurality of accuracy thresholds are preset, and that the sensitivity threshold is varied as a function of the accuracy threshold reached during the learning phase.

13. Circuit for carrying out the process in accordance with claim 1, characterized in that it has a low-pass filter circuit for forming the speed correction factors on the basis of the wheel speed signals; that the attenuation characteristic of the low-pass filter circuit is variable as a function of the travel situation, which is reflected by the output signal of a travel situation recognition circuit; and that circuits for determining or estimating the travel situation-dependent tolerances and circuits for determining or estimating the travel situation-dependent deviations from the speed correction factors are present.

14. A circuit for monitoring the tire pressure of the wheels of a vehicle comprising:

means for developing indications of the wheel speed of the individual wheels of the vehicle;

a travel situation recognition circuit for developing an indication of the travel situation of the vehicle;

a low-pass filter circuit responsive to said wheel speed indications and said travel situation indication for forming speed correction factors, said low-pass filter having an attenuation characteristic which is variable as a function of said travel situation indication;

means responsive to said travel situation indication for determining travel situation-dependent tolerances; and means for determining travel situation-dependent deviations of said speed correction factors.

\* \* \* \* \*